US008518234B2

(12) United States Patent
Rakowski

(10) Patent No.: US 8,518,234 B2
(45) Date of Patent: Aug. 27, 2013

(54) OXIDATION RESISTANT FERRITIC STAINLESS STEELS

(75) Inventor: James A. Rakowski, Pittsburgh, PA (US)

(73) Assignee: ATI Properties, Inc., Albany, OR (US)

( * ) Notice: Subject to any disclaimer, the term of this patent is extended or adjusted under 35 U.S.C. 154(b) by 1336 days.

(21) Appl. No.: 10/654,203

(22) Filed: Sep. 3, 2003

(65) Prior Publication Data

US 2005/0045250 A1 Mar. 3, 2005

(51) Int. Cl.
*B23H 3/00* (2006.01)
*C22C 38/18* (2006.01)
*H01M 8/12* (2006.01)
*H01M 4/64* (2006.01)

(52) U.S. Cl.
USPC ............ 205/640; 429/522; 429/479; 420/40

(58) Field of Classification Search
USPC ................. 205/640; 420/40; 429/522, 479
See application file for complete search history.

(56) References Cited

U.S. PATENT DOCUMENTS

| 2,338,321 | A | * | 1/1944 | Faust | 205/675 |
| 2,692,853 | A | * | 10/1954 | Gamble | 205/675 |
| 4,097,311 | A | * | 6/1978 | Ishibashi et al. | 428/336 |
| 4,192,934 | A | | 3/1980 | Takahashi et al. | |
| 4,248,943 | A | | 2/1981 | Ludwig et al. | |
| 4,374,666 | A | | 2/1983 | Devine, Jr. | |
| 4,408,709 | A | | 10/1983 | Devine, Jr. | |
| 4,418,859 | A | | 12/1983 | Devine, Jr. | |
| 4,884,708 | A | | 12/1989 | Lange et al. | |
| 5,066,370 | A | | 11/1991 | Andreshak et al. | |
| 5,228,932 | A | * | 7/1993 | Shimizu et al. | 148/603 |
| 6,116,092 | A | | 9/2000 | Ohmi et al. | |
| 6,641,780 | B2 | * | 11/2003 | Grubb | 420/68 |
| 2003/0116536 | A1 | | 6/2003 | Ohtani et al. | |
| 2003/0170526 | A1 | | 9/2003 | Hodgson et al. | |

FOREIGN PATENT DOCUMENTS

| JP | 06-172933 | | * | 6/1994 |
| JP | 09-157801 | A | | 6/1997 |
| JP | 09-209092 | | * | 8/1997 |
| JP | 10-088391 | | * | 4/1998 |
| JP | 10-280103 | | * | 10/1998 |
| JP | 2002-075399 | A | | 3/2002 |
| JP | 2003-173795 | A | | 6/2003 |
| WO | WO 99/10554 | | * | 3/1999 |
| WO | WO 02/13300 | A1 | | 2/2002 |
| WO | WO 03/006149 | A1 | | 1/2003 |

OTHER PUBLICATIONS

Aries et al, Effect of stabilising heat treatment on characteristics of electrolytic alumina coating on ferritic stainless steel, 2000, Materials and Corrosion, 51, 496-501.*
English Translation of Takehiro (JP 10-280103).*
Ralph et al., 2001, "Materials for lower temperature solid oxide fuel cells", Journal of Materials Science, vol. 36, pp. 1161-1172.*
Szummer, A., Jezierska, E., Lublinska, K., 1999, Journal of Alloys and Compounds, "Hydrogen surface effects in ferritic stainless steels", pp. 356-360.*
Coating. (n.d.). Collins English Dictionary—Complete & Unabridged 10th Edition. Retrieved Oct. 14, 2010, from Dictionary.com website: http://dictionary.reference.com/browse/coating.*
Patent Abstracts of Japan, Abstract of Japanese Patent Pub. No. 62205300 A (application publication date of Sep. 9, 1987), dated 1987.
Patent Abstracts of Japan, Abstract of Japanese Patent Pub. No. 56153000 A (application publication date of Nov. 26, 1981), dated 1981.
"The Effect of Nanocrystallization on the Selective Oxidation and Adhesion of $Al_2O_3$ Scales", F. Wang, *Oxidation of Metals*, vol. 48, Nos. 3/4 (1997).
"The Effect of Surface Preparation on the Oxidation Behavior of Gamma TiAl-Base Intermetallic Alloys", J. Rakowski, et al., *Scripta Materialia*, vol. 35, No. 12, pp. 1417-1422 (1996).
T. Horita et al., "Stability of Fe—Cr alloy interconnects under $CH_4$-$H_2O$ atmosphere for SOFC's" Journal of Power Sources (Elsevier), vol. 118 (2003) pp. 35-43.
Patent Abstracts of Japan, Abstract of Japanese Patent Pub. No. 08269754 (application publication date of Oct. 15, 1996), dated 1996.
International Search Report and Written Opinion for corresponding International Application No. PCT/US2004/028243, mailed from European Patent Office Jun. 17, 2005.
C.S. Giggins and F.S. Pettit, "The Effect of Alloy Grain-Size and Surface Deformation on the Selective Oxidation of Chromium in Ni—Cr Alloys at Temperatures of 900° and 1100° C", Transactions of the Metallurgical Society of AIME, vol. 245 (Dec. 1969), pp. 2509-2514.

* cited by examiner

*Primary Examiner* — Jessee R. Roe
(74) *Attorney, Agent, or Firm* — K & L Gates LLP; Patrick J. Viccaro; John E. Grosselin, III

(57) ABSTRACT

A method for making a ferritic stainless steel article having an oxidation resistant surface includes providing a ferritic stainless steel comprising aluminum, at least one rare earth metal and 16 to less than 30 weight percent chromium, wherein the total weight of rare earth metals is greater than 0.02 weight percent. At least one surface of the ferritic stainless steel is modified so that, when subjected to an oxidizing atmosphere at high temperature, the modified surface develops an electrically conductive, aluminum-rich, oxidation resistant oxide scale comprising chromium and iron and a having a hematite structure differing from $Fe_2O_3$, alpha $Cr_2O_3$ and alpha $Al_2O_3$. The modified surface may be provided, for example, by electrochemically modifying the surface, such as by electropolishing the surface.

11 Claims, 13 Drawing Sheets

OXIDATION RESISTANT FERRITIC STAINLESS STEELS

BACKGROUND OF THE INVENTION

1. Field of the Invention

The present disclosure relates to methods of making ferritic stainless steels having at least one oxidation resistant surface. The present disclosure also relates to ferritic stainless steels including at least one oxidation resistant surface, and further relates to articles of manufacture formed of or including such ferritic stainless steels.

2. Description of the Invention Background

Fuel cells are energy conversion devices that generate electricity and heat by electrochemically combining a gaseous fuel and an oxidizing gas via an ion-conducting electrolyte. A primary feature of fuel cells is the ability to convert chemical energy directly into electrical energy in the absence of combustion, which provides significantly higher conversion efficiencies than reciprocating engines, gas turbines and other conventional thermomechanical methods of producing energy. For the same power output, fuel cells produce substantially less carbon dioxide emissions than technologies based on fossil fuels. Fuel cells also produce negligible amounts of $SO_x$ and $NO_x$, which are the main constituents of acid rain and photochemical smog.

Several types of fuel cells are currently being developed. A primary difference between these fuel cell types is the material utilized as the electrolyte, which effects operating temperature. NASA developed alkaline fuel cells including a liquid electrolyte in the 1960's to power Apollo and other spacecraft, and NASA currently uses greatly improved versions on the Space Shuttle. Solid oxide fuel cells (SOFCs), in contrast, are constructed entirely of solid-state materials, using a fast oxygen ion-conducting ceramic (typically yttria-stabilized zirconia or "YSZ") as the electrolyte, and operate in a temperature range of about 500° C. (932° F.) to 1000° C. (1832° F.) to facilitate solid-state transport. Advantages of SOFCs relative to other fuel cell types include high energy efficiency and few problems with electrolyte management (liquid electrolytes are typically corrosive and may be difficult to handle). SOFCs also produce high-grade waste heat, which can be used in combined heat and power devices, and internal reforming of hydrocarbon fuels (to produce hydrogen and methane) is possible.

An organization promoting development of SOFCs in the United States is the Solid State Energy Conversion Alliance (SECA). SECA consists of an Industry Group, which is focused on building integrated SOFCs using technologies developed by the SECA member companies, and a Core Technology Group, which carries out fundamental research driven by the needs of the Industry Group as a whole. The SECA program, which was organized and is overseen by the United States Department of Energy's Office of Fossil Energy, has set certain cost and performance goals for SOFCs under development.

A single SOFC "cell" or subunit includes an anode and a cathode, which are separated by the electrolyte. Because current generation SOFCs operate at temperatures up to about 1000° C. (about 1832° F.), the electrodes are generally constructed from ceramic materials to avoid environmental degradation. Both the anode and cathode layers are intentionally permeable to gases via the establishment of a network of interconnected porosity and are good electrical conductors (e.g., they exhibit essentially no ionic conductivity). In current generation SOFCs, the anode is typically formed from an electrically conductive nickel/YSZ composite (a ceramic/metal composite or "cermet"). The nickel provides a continuous electrically conductive path, while the YSZ serves to reduce the coefficient of thermal expansion of the overall composite and prevents the porosity from sintering shut. The nickel particles are protected from oxidation by the hydrogen-rich gas present at the anode, which is reducing to pure nickel. The cathode may be based on, for example, lanthanum manganate ($LaMnO_3$), typically doped with strontium (replacing some of the lanthanum to yield $La_{1-x}Sr_xMnO_3$) to improve its electrical conductivity. The electrolyte is typically a thin (relative to the anode and cathode) layer of fully dense YSZ.

During operation of the SOFC cell, an oxidant (such as $O_2$ or air) is fed into the fuel cell on the cathode side, where it supplies oxygen ions to the electrolyte by accepting electrons from an external circuit by the following half-cell reaction:

$$\tfrac{1}{2}O_{2(g)} + 2e^- = O^{-2}$$

The oxygen atoms pass through the YSZ electrolyte via solid state diffusion to the electrolyte/anode interface. The SOFC can employ hydrogen ($H_2$) and/or carbon monoxide (CO) as a basic fuel. Operationally, pure hydrogen can be used as supplied, while a hydrocarbon fuel such as methane, kerosene, or gasoline must be partially combusted, or reformed, to hydrogen and carbon monoxide. This is typically accomplished internally within the fuel cell, aided by the high operating temperature and by steam injection. The fuel gas mixture penetrates the anode to the anode/electrolyte interface, where it reacts with the oxygen ions from the ion-conducting electrolyte in the following two half-cell reactions:

$$H_{2(g)} + O^{-2} = 2e^- + H_2O_{(g)}$$

$$CO_{(g)} + O^{-2} = 2e^- + CO_{2(g)}$$

This releases electrons, which re-enter the external circuit. The flow of electrical charge due to oxygen ion transport through the electrolyte from cathode to anode is balanced exactly by the flow of electrical charge due to electron conduction in the external circuit. The driving force is the need to maintain overall electrical charge balance. The flow of electrons in the external circuit provides useful power at a potential of approximately one volt.

To generate a reasonable voltage, fuel cells are not operated as single units but, instead, as "stacks" composed of a series arrangement of several individual cells with an "interconnect" joining and conducting current between the anode and cathode of immediately adjacent cells. A common stack design is the flat-plate or "planar" SOFC (PSOFC), which is shown in a schematic form in FIG. 1. In the PSOFC 10 of FIG. 1, a single energy conversion cell 12 includes cathode 20 and anode 30 separated by electrolyte 40. Interconnect 50 separates anode 30 from cathode 60 of an immediately adjacent energy conversion cell 14 (not fully shown) within the stack. PSOFC 10 includes a repeating arrangement of cells identical to cell 12, with an interconnect disposed between each adjacent unit.

The design of a SOFC interconnect is critical because the interconnect serves several functions, including separating and containing the reactant gases and providing a low resistance path for current so as to electrically connect the cells in series. In general, the interconnect material must withstand the harsh high-temperature environmental conditions within the cells; must be suitably electrically conductive (including any oxides or other surface film or scale corrosion that forms on the material); and must have a coefficient of thermal expansion (CTE) that is sufficiently similar to the CTE of the ceramic electrodes within the cells to ensure the requisite structural integrity and gas-tightness of the fuel cell stack.

Initial PSOFC designs used a doped lanthanum chromate (LaCrO$_3$) ceramic material as the interconnect material. LaCrO$_3$ ceramic does not degrade at the high temperatures at which SOFCs operate and has a coefficient of thermal expansion that substantially matches the other ceramic components of the fuel cell. LaCrO$_3$ ceramic, however, is brittle, difficult to fabricate, and extremely expensive. To address these deficiencies, metallic interconnects have been proposed for use in PSOFCs. These include interconnects formed from nickel-base alloys, such as AL 600™ alloy, and certain austenitic stainless steels, such as the 300 series family, the prototype of which is Type 304 alloy. Ferritic stainless steels, such as ALFA-II® alloy, E-BRITE® alloy and AL 453™ alloy also have been proposed for use in PSOFC interconnects. Table 1 provides nominal compositions for the foregoing nickel-base and stainless steel alloys, all of which are available from Allegheny Ludlum Corporation, Pittsburgh, Pa.

TABLE 1

| Alloy | Composition (weight percent) | | | | | | |
|---|---|---|---|---|---|---|---|
| | Ni | Cr | Fe | Al | Si | Mn | Other |
| AL 453 ™ alloy | 0.3 max. | 22 | bal. | 0.6 | 0.3 | 0.3 | 0.06 Ce + La max. |
| E-BRITE ® alloy | 0.15 max. | 26 | bal. | 0.1 | 0.2 | 0.05 | 1 Mo |
| ALFA-II ™ alloy | 0.3 max. | 13 | bal. | 3 | 0.3 | 0.4 | 0.4 Ti |
| AL 600 ™ alloy | bal. | 15.5 | 8 | — | 0.2 | 0.25 | — |
| Type 304 alloy | 8 | 18 | bal. | — | — | — | — |

Ferritic stainless steels have certain properties that make them attractive for PSOFC interconnect applications, including low cost, good fabricability, and CTE compatible with ceramic. Metallic interconnects, however, generally tend to form a surface oxide layer with low electrical conductivity at the high temperatures typical of PSOFC operation. This layer grows thicker with time and increases the resistivity of the interconnects and of the PSOFC stack as a whole. Certain alloys, upon exposure to oxygen at high temperatures, form surface oxides that thicken at an extremely slow rate (for example, the Al$_2$O$_3$ scale of ALFA-II® alloy) or are highly electrically conductive (for example, the NiO scale of pure or dispersion-strengthened nickel). However, the underlying mechanism that controls these two seemingly disparate factors (resistivity and rate of oxide formation) is essentially the same (the electronic defect structure of the oxide), resulting in very few oxides that are both slow growing and electrically conductive.

Ferritic stainless steels have attracted interest as interconnect material in part because in their conventional form they develop a scale consisting primarily of chromium oxide (Cr$_2$O$_3$), which is both relatively slow-growing and electrically conductive at high temperatures. Heat-resistant alloys that rely on oxidation of chromium may offer a compromise between relatively slow oxide scale growth and appreciable electrical conductivity at high temperature. Nevertheless, the rate of oxidative degradation of commercially available chromia-forming ferritic stainless steels would result in degradation of fuel stack performance over time. Alternative, non-metallic materials from which interconnects may be constructed, particularly perovskite ceramics (such as LaCrO$_3$), do not exhibit similar levels of degradation, but increase the cost of the PSOFC stack to uneconomical levels.

Accordingly, there is a need for novel fuel cell interconnect material that is both economical and exhibits a suitable level of oxidation resistance when subjected to PSOFC operating conditions over time. More generally, there is a need for a ferritic stainless steel having improved oxidation resistance when exposed at high temperatures to an oxidizing environment.

SUMMARY

In order to address the above-described needs, the present disclosure provides a method for making a ferritic stainless steel article having an oxidation resistant surface. The method includes providing a ferritic stainless steel comprising aluminum, at least one rare earth metal and 16 to less than 30 weight percent chromium, wherein the total weight of rare earth metals is greater than 0.02 weight percent. At least one surface of the ferritic stainless steel is modified so that, when subjected to an oxidizing atmosphere at high temperature, the modified surface develops an electrically conductive, aluminum-rich, oxidation resistant oxide scale comprising chromium and iron and a having a hematite structure differing from the hematite structure of Fe$_2$O$_3$, alpha Cr$_2$O$_3$ and alpha Al$_2$O$_3$. In certain embodiments of the method, the lattice parameters $a_o$ and $c_o$ of the aluminum-rich, oxidation resistant oxide scale differ from those of Fe$_2$O$_3$, alpha Cr$_2$O$_3$ and alpha Al$_2$O$_3$. Also, in certain embodiments of the method, the modified surface of the ferritic stainless steel is modified electrochemically, such as, for example, by electropolishing the surface.

The present disclosure also is directed to a ferritic stainless steel including aluminum, at least one rare earth metal and 16 to less than 30 weight percent chromium, wherein the total weight of rare earth metals is greater than 0.02 weight percent. At least one surface of the ferritic stainless steel is modified so that the modified surface develops an aluminum-rich oxide scale when heated in an oxidizing atmosphere for 100 hours or more at a temperature in the range of 750° C. (1382° F.) to 850° C. (1562° F.), wherein the oxide scale includes iron and chromium and has a hematite structure, $a_o$ in the range of about 4.95 to about 5.04 Å and $c_o$ in the range of about 13.58 to about 13.75 Å.

The present disclosure is further directed to a method for making a ferritic stainless steel article having an oxidation resistant surface, and wherein the steel includes aluminum, at least one rare earth metal and 16 to less than 30 weight percent chromium, the total weight of rare earth metals being greater than 0.02 weight percent. The oxidation resistant surface of the ferritic stainless steel is provided by electrochemically modifying the surface, such as, for example, by electropolishing the surface. In one embodiment of the method, the electrochemically modified surface develops an aluminum-rich oxide scale including iron and chromium and having a hematite structure, $a_o$ in the range of 4.95 to 5.04 Å and $c_o$ in the range of 13.58 to 13.75 Å, when heated in an oxidizing atmosphere for 100 hours or more at a temperature in the range of 750° C. (1382° F.) to 850° C. (1562° C.). Also, in certain embodiments of the method, the article is one of a plate, a sheet, a strip, a foil, a bar, a fuel cell interconnect, a high-temperature manufacturing apparatus, a high-temperature handling apparatus, a calcining apparatus, a glass making apparatus, a glass handling apparatus, and a heat exchanger component. An example of electropolishing a surface of the ferritic stainless steel includes placing the surface of the article in a bath containing an electropolishing solution and a cathode, and passing current between the steel and the cathode so that material is removed from the surface, thereby reducing surface roughness. An electropolished surface, for example, has been found to exhibit significantly improved resistance to oxidation when subjected to a temperature and an atmosphere characteristic of operating conditions within a solid oxide fuel cell.

Yet another aspect of the present disclosure is directed to a method of improving high temperature oxidation resistance of a ferritic stainless steel article comprising 16 to less than 30 weight percent chromium, at least 0.2 weight percent aluminum, and at least one rare earth metal, wherein the total weight of rare earth metals is greater than 0.02 up to 1.0 weight percent. The method includes modifying a surface of the article, such as, for example, by electrochemically modifying the surface. One example of an electrochemically modified is an electropolished surface. The modified surface develops an aluminum-rich oxide layer having a hematite structure when subjected to an atmosphere and temperature characteristic of conditions to which a solid oxide fuel cell interconnect is subjected during fuel cell operation.

An additional aspect of the present invention is directed to a method of making an SOFC. The method includes providing at least one SOFC interconnect including a ferritic stainless steel including aluminum, at least one rare earth metal and 16 to less than 30 weight percent chromium, wherein the total weight of rare earth metals is greater than 0.02 weight percent. The interconnect includes at least one modified surface that, when subjected to an oxidizing atmosphere at high temperature, develops an electrically conductive, aluminum-rich, oxidation resistant oxide scale comprising chromium and iron and a having a hematite structure the modified surface develops an electrically conductive, aluminum-rich, oxidation resistant oxide scale comprising chromium and iron and a having a hematite structure differing from the hematite structure of $Fe_2O_3$, alpha $Cr_2O_3$ and alpha $Al_2O_3$. In certain embodiments of the method, the lattice parameters $a_o$ and $c_o$ of the aluminum-rich, oxidation resistant oxide scale differ from those of $Fe_2O_3$, alpha $Cr_2O_3$ and alpha $Al_2O_3$. The interconnect and additional components including at least one anode, at least one cathode, and at least one electrolyte, are assembled to provide the SOFC.

A further aspect of the present disclosure is directed to a method of making a solid oxide fuel cell wherein at least one interconnect is provided including a ferritic stainless steel comprising aluminum, at least one rare earth metal and 16 to less than 30 weight percent chromium, wherein the total weight of rare earth metals is greater than 0.02 weight percent. The interconnect includes at least one electrochemically modified surface. The surface may be electrochemically modified by, for example, electropolishing the surface. The interconnect and additional components comprising at least one anode, at least one cathode, and at least one electrolyte are assembled to provide the fuel cell. In one embodiment of the method, an electropolished surface develops an aluminum-rich oxide scale including iron and chromium and having a hematite structure, $a_o$ in the range of 4.95 to 5.04 Å and $c_o$ in the range of 13.58 to 13.75 Å, when heated in an oxidizing atmosphere for 100 hours or more at a temperature in the range of 750° C. (1382° F.) to 850° C. (1562° F.).

The present disclosure also is directed to a ferritic stainless steel including aluminum, at least one rare earth metal and 16 to less than 30 weight percent chromium, wherein the total weight of rare earth metals is greater than 0.02 weight percent. The ferritic stainless steel further includes at least one modified surface that, when subjected to an oxidizing atmosphere at high temperature, develops an electrically conductive, aluminum-rich, oxidation resistant oxide scale comprising chromium and iron and a having a hematite structure the modified having a hematite structure differing from the hematite structure of $Fe_2O_3$, alpha $Cr_2O_3$ and alpha $Al_2O_3$. In certain embodiments, the lattice parameters $a_o$ and $c_o$ of the aluminum-rich, oxidation resistant oxide scale differ from those of $Fe_2O_3$, alpha $Cr_2O_3$ and alpha $Al_2O_3$. Also, in certain embodiments the oxide scale is characterized by $a_o$ in the range of 4.95 to 5.04 Å and $c_o$ in the range of 13.58 to 13.75 Å. Also, in certain embodiments, the modified surface of the ferritic stainless steel is an electrochemically modified surface, such as an electropolished surface.

Yet another aspect of the present disclosure is directed to a ferritic stainless steel comprising aluminum, at least one rare earth metal and 16 to less than 30 weight percent chromium, wherein the total weight of rare earth metals is greater than 0.02 weight percent, and wherein the ferritic stainless steel further comprises at least one electrochemically modified surface. In certain embodiments, the at least one electrochemically modified surface is an electropolished surface, and wherein the at least one electropolished surface develops an aluminum-rich oxide scale including iron and chromium and having a hematite structure, $a_o$ in the range of 4.95 to 5.04 Å and $c_o$ in the range of 13.58 to 13.75 Å when heated for 100 hours or more at 750° C. (1382° F.) to 850° C. (1562° F.) in an oxidizing atmosphere. As further described here, in certain embodiments of the ferritic stainless steel, the at least one electrochemically modified surface is at least one electropolished surface exhibiting improved resistance to oxidation when subjected to atmosphere and temperature conditions characteristic of the operating conditions in a solid oxide fuel cell.

An additional aspect of the present disclosure provides a ferritic stainless steel comprising 16 to less than 30 weight percent chromium, at least 0.2 weight percent aluminum, and at least one rare earth metal, wherein the total weight of rare earth metals is greater than 0.02 up to 1.0 weight percent. The ferritic stainless steel further includes at least one oxidation resistant modified surface that develops an aluminum-rich oxide layer when heated in air at a temperature in the range of 750° C. to 850° C. In certain embodiments, the modified surface is an electrochemically modified surface such as, for example, and electropolished surface.

The present disclosure also discloses an article of manufacture including a ferritic stainless steel comprising aluminum, at least one rare earth metal and 16 to less than 30 weight percent chromium, wherein the total weight of rare earth metals is greater than 0.02 weight percent. The ferritic stainless steel further has at least one modified surface, which may be, for example, an electrochemically modified surface. When subjected to an oxidizing atmosphere at high temperature, the modified surface develops an electrically conductive, aluminum-rich, oxidation resistarit oxide scale comprising chromium and iron and a having a hematite structure differing from $Fe_2O_3$, alpha $Cr_2O_3$ and alpha $Al_2O_3$. In certain embodiments, the modified surface is an electropolished surface.

The present disclosure also provides for an article of manufacture including a ferritic stainless steel comprising aluminum, at least one rare earth metal and 16 to less than 30 weight percent chromium, wherein the total weight of rare earth metals is greater than 0.02 weight percent. The ferritic stainless steel includes at least one modified surface such as, for example, an electrochemically modified surface. The at least one electrochemically modified surface may be, for example, at least one electropolished surface. In certain embodiments, the article of manufacture is selected from a fuel cell, a solid oxide fuel cell, a planar solid oxide fuel cell, a fuel cell interconnect, a high-temperature manufacturing apparatus, a high-temperature handling apparatus, a calcining apparatus, a glass making apparatus, a glass handling apparatus and a heat exchanger component.

Additional aspects of the present disclosure describe a fuel cell including an anode, a cathode, a solid electrolyte intermediate the anode and the cathode and an interconnect. The interconnect includes a ferritic stainless steel comprising 16 to less than 30 weight percent chromium, at least 0.2 weight percent aluminum, and at least one rare earth metal, wherein the total weight of rare earth metals is greater than 0.02 up to 1.0 weight percent. The ferritic stainless steel further includes at least one modified surface that, when subjected to an oxidizing atmosphere at high temperature, develops an electrically conductive, aluminum-rich, oxidation resistant oxide scale comprising chromium and iron and a having a hematite structure differing from the hematite structure of $Fe_2O_3$, alpha $Cr_2O_3$ and alpha $Al_2O_3$. In certain embodiments of the fuel cell, the lattice parameters $a_o$ and $c_o$ of the aluminum-rich, oxidation resistant oxide scale differ from those of $Fe_2O_3$, alpha $Cr_2O_3$ and alpha $Al_2O_3$. Also, in certain embodiments of the fuel cell, the at least one modified surface of the ferritic stainless steel is an electrochemically modified surface such as, for example, an electropolished surface.

A further aspect of the present disclosure provides for a fuel cell including an anode, a cathode, a solid electrolyte intermediate the anode and the cathode and an interconnect comprising a ferritic stainless steel including aluminum, at least one rare earth metal and 16 to less than 30 weight percent chromium, wherein the total weight of rare earth metals is greater than 0.02 weight percent. The ferritic stainless steel includes at least one electrochemically modified surface such as, for example, an electropolished surface. In one embodiment, an electropolished surface of the ferritic stainless steel develops an aluminum-rich oxide scale including iron and chromium and having a hematite structure, $a_o$ in the range of 4.95 to 5.04 Å and $c_o$ in the range of 13.58 to 13.75 Å when heated for 100 hours or more at 750° C. (1382° C.) to 850° C. (1562° F.) in an oxidizing atmosphere. The fuel cell, in certain embodiments, may be selected from a solid oxide fuel cell and a planar solid oxide fuel cell. Also, in certain embodiments the fuel cell is a part of a fuel cell stack including a plurality of cells, each cell comprising an anode, a cathode, an electrolyte and an interconnect, wherein the interconnects electrically connects the plurality of cells in series.

The novel methods, materials and articles described in the present disclosure are directed to or include ferritic stainless steels that are both economical relative to certain conventional alternative materials and exhibit a suitable level of oxidation resistance when subjected over time to the high temperature conditions characteristic of, for example, the internal operating conditions of a PSOFC. As such, the methods, materials and articles described herein are believed to be particularly suited for application in the manufacture of PSOFCs and other fuel cells. More generally, the novel methods, materials and articles described in the present disclosure provide ferritic stainless steels that exhibit improved oxidation resistance when exposed at high temperatures to an oxidizing environment, as well as articles including such steels.

These and other advantages will be apparent upon consideration of the following description of certain embodiments.

BRIEF DESCRIPTION OF THE FIGURES

Embodiments of the present invention will be understood by reference to the following figures, wherein.

DESCRIPTION OF EMBODIMENTS

Figure 1:
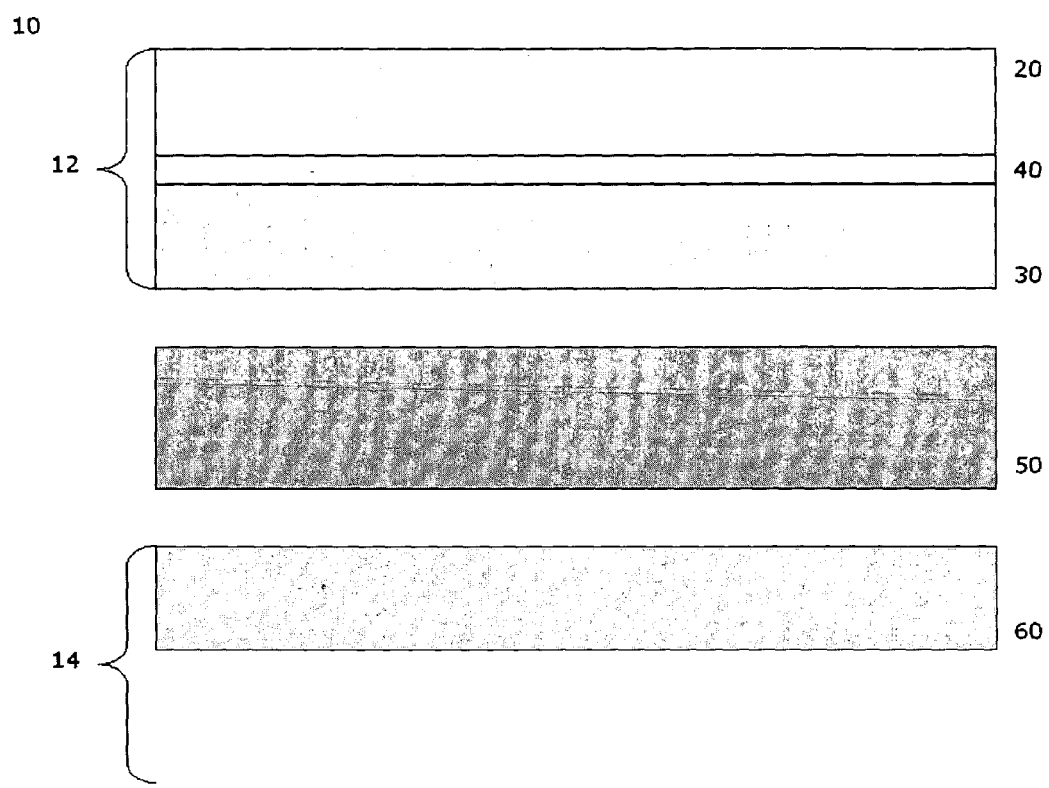
FIG. 1 is a schematic depiction of elements of a portion of a PSOFC stack.

As discussed above, ferritic stainless steels have been considered as possible cost-effective replacement materials for SOFC interconnects. However, the gaseous reactants flowing on both sides of an interconnect are oxidizing to iron-chromium ferritic stainless steels. An oxidized interconnect is a less efficient electrical current conductor, and the efficiency of the fuel cell stack as a whole decreases over time as the oxide layers on interconnects within the fuel cell increase in thickness. The inherent limitations of current generation metallic interconnects has limited available PSOFC designs to relatively inefficient, low temperature operation (approximately 700° C. (1292° F.)) in order to prevent excessive oxidation on the interconnect surfaces.

One ferritic stainless steel previously considered for use as SOFC interconnect material is AL 453™ alloy, which is a ferritic stainless steel including rare earth metals (REMs) and having a nominal composition as shown in Table 1 above. REM in the form of mischmetal is added during production of AL 453™ alloy. Mischmetal is an available commercial form of mixed REMs and can be obtained with different compositions having known concentrations of the REMs cerium, lanthanum and praseodymium. For example, a common mischmetal form used in steelmaking is nominally 50Ce-30La-20Pr by weight. The general chemistry of AL 453™ alloy includes, in weight percentages, nominally 22Cr-0.6Al-0.06 (Ce+La), along with about 0.3 weight percent each of silicon, nickel and manganese, and balance iron and incidental impurities (such as about 250 ppmw (parts-per-million, by weight) carbon and 300 ppmw nitrogen).

As is known in the art, REM addition in a chromium-containing alloy such as AL 453™ alloy should result in the formation of an adherent, slow-growing chromium oxide scale at high temperatures. However, it has been determined that the high temperature oxidation resistance of conventional AL 453™ alloy is generally inferior to that of higher-chromium commercially available ferritic stainless steels.

It is believed that unmodified commercially available ferritic stainless steels do not have suitable environmental resistance for use as interconnects in SOFCs. As described in the present disclosure, however, it has unexpectedly been determined that modifying all or a portion of one or more surfaces of AL 453™ alloy and ferritic stainless steel alloys having similar compositions can significantly increase the oxidation resistance of the modified areas. For example, the following disclosure shows that electrochemically modifying a surface of an AL 453™ alloy decreased the oxidation rate of the surface by several orders of magnitude relative to the same alloy prepared with a conventional 2BA surface (a standard commercial finish provided by cold rolling with smooth rolls and then annealing in a reducing dry hydrogen atmosphere) when exposed to air and temperatures typical of internal operating conditions of SOFCs.

As used herein, "electrochemically modifying" a surface or surface region of an alloy or an article means applying a current to the surface in the presence of a chemical on the surface.

In the examples described below, the electrochemical modification was carried out by application of electropolishing. As is known in the art, electropolishing is an electrochemical process wherein a portion of a metal or metal alloy is electrolytically removed in a highly ionic solution by the action of an electric potential and current. Electropolishing is conventionally used to remove a thin layer of material from the surface of a metallic article, such as a part or component, and to thereby reduce the surface roughness of the article and improve surface finish. A typical conventional electropolishing apparatus generally comprises a bath including an electropolishing solution (typically a mixture of phosphoric and sulfuric acids) into which the workpiece is placed for processing. The solution acts as the electrolyte and carries metal ions from an anode to a cathode. The workpiece serves as the anode, and the cathode is typically in the form of one or more metal structures of suitable composition shaped so as to provide generally even current densities to the surface of the workpiece (anode). The workpiece and cathode, respectively, may be connected to the positive and negative terminals of a rectifier. It is conventionally believed that when current is applied to the workpiece and cathode in the bath, the character of the film of electropolishing solution on the surface of the workpiece is modified, and the film becomes viscous and assumes the properties of an insulator or resistor. The greater the thickness of the viscous film, the greater the resistive or insulating properties of the film. Thus, considering a particular surface on the workpiece, a relatively thin electrically insulating film covers workpiece portions that protrude significantly from the workpiece, and a relatively thick insulating film covers workpiece portions that protrude from the workpiece to a lesser degree. The further a portion of the workpiece projects into the viscous insulating film, the thinner the insulating film and the more charge received by the portion from the cathode. In this way, surface irregularities that protrude to a greater extent receive proportionally greater current from the cathode and dissolve more quickly than surface irregularities that protrude to a lesser degree. This has the effect of reducing surface irregularities and producing an improved surface finish.

As is known in the art, the electropolishing process may be carried out in a number of ways. For example, in a mill setting, electropolishing may be conducted on coils of strip material or on finished pieces. On a small, experimental scale, one electropolishing technique that has been employed for iron-chromium stainless steels includes immersing samples of alloy in an electrolyte contained within a shallow glass dish. An example of a typical electrolyte used in the small-scale process is a solution of 25% sulfuric acid-47% phosphoric acid-28% glycolic acid (all by volume), which is maintained at a temperature of approximately 170° F. The samples immersed in the electrolyte are connected to a potentiostat via electrically conductive leads, and a current of approximately 1 amp/inch$^2$ is applied. In one particular process, alloy samples may be electropolished in this way for approximately 20 minutes and are flipped every 5 minutes. The alloy samples also may be pre-treated by grinding to a smooth surface using abrasive papers and then cleaning/degreasing.

Nothing herein concerning particular electropolishing techniques is intended to limit the present disclosure or the scope of the appended claims in any way. Those of ordinary skill, upon considering the present disclosure, may readily adapt known electropolishing techniques to electrochemically modify surfaces of ferritic stainless steels having the compositions described herein to provide modified surfaces having the improved oxidation resistance properties discovered by the present inventor.

It is known to electrochemically modify the surfaces of certain austenitic stainless steels. For example, it is known to electropolish certain austenitic stainless steels used in medical and pharmaceutical applications to provide surfaces that are clean and generally free of crevices. However, electropolishing or otherwise electrochemically modifying the surfaces of ferritic stainless steels is not generally applied, and it has not heretofore been considered useful to electropolish ferritic stainless steels to improve their high temperature oxidation resistance properties.

Results illustrating the unexpected observation that electropolishing significantly enhances oxidation resistance of certain ferritic stainless steels is set forth in the examples below. Based on the following results it is believed that at least some aluminum and REM must be present in the stainless steel to produce the improvement in oxidation resistance provided by electrochemical modification, since it was found that reducing the content of these alloying additions in the steel corresponds to increased oxidation. The concentration of chromium believed necessary in the stainless steel was determined to be quite broad—a ferritic stainless steel alloy must include at least 16 weight percent chromium to be suitably heat-resistant, and no commercial wrought ferritic stainless steels currently exist with more than 26 weight percent chromium.

Example 1

A coil of AL 453™ alloy was provided by the conventional process of casting the alloy to a slab or ingot, hot reducing to a band, cold rolling to finished gauge with intermediate stress relieving anneals, and a final anneal in hydrogen. Several 1"×2" test coupons were prepared from the coil and processed by three different surface treatments. Each coupon had an initial thickness of 0.075" and a standard 2BA finish, and was degreased and had finished edges. This surface finish is generally referred to herein as a "mill" surface, and samples including that surface are referred to herein as "mill" samples. Several mill samples were further processed by grinding using 120 grit SiC paper to remove nominally 0.005" per side. Samples prepared in this way are referred to herein as "ground" samples. Several of the ground samples were electropolished in an electropolishing solution including, by volume, 25% sulfuric acid-47% phosphoric acid-28% glycolic acid for 20 minutes (samples flipped every 5 minutes) at 1 amp/inch$^2$ at approximately 170° F. (about 77° C.) to provide several "electropolished" samples.

The three surface types were characterized using Auger electron microscopy prior to high temperature oxidation testing. The ground and electropolished samples both exhibited extremely thin native oxides (about 30 Angstroms thick), while the mill surface oxide was approximately four times thicker (about 130 Angstroms thick). There was a marked difference in surface oxide chemistry between the samples. The mill surface oxide was the only oxide containing significant levels of aluminum. Aluminum has a high affinity for oxygen and will react with the trace amount of residual oxygen in a hydrogen annealing furnace to form a thin alumina scale. The ground surface oxide was essentially representative of the base metal composition and was due to the formation of a native oxide, which occurs for all chromium-bearing stainless steels in air. The oxide formed on the electropolished samples was enriched in chromium by approximately 60-70% with respect to the base metal, e.g., to an absolute level of about 30 weight percent. The aluminum content in the oxide scales formed at room temperature on both the ground and electropolished surfaces was too low to be detected using the Auger analysis.

AL 453™ alloy coupons having surfaces in each of the mill, ground and electropolished conditions were placed in aluminum oxide crucibles and exposed to still air for times ranging from 5-500 hours at 750° C. (1382° F.) and 850° C. (1562° F.). The samples were removed from the oven periodically and weighed to assess resistance to oxide scaling, resulting in an average thermal cycle time of approximately 50 hours.

Figure 2:
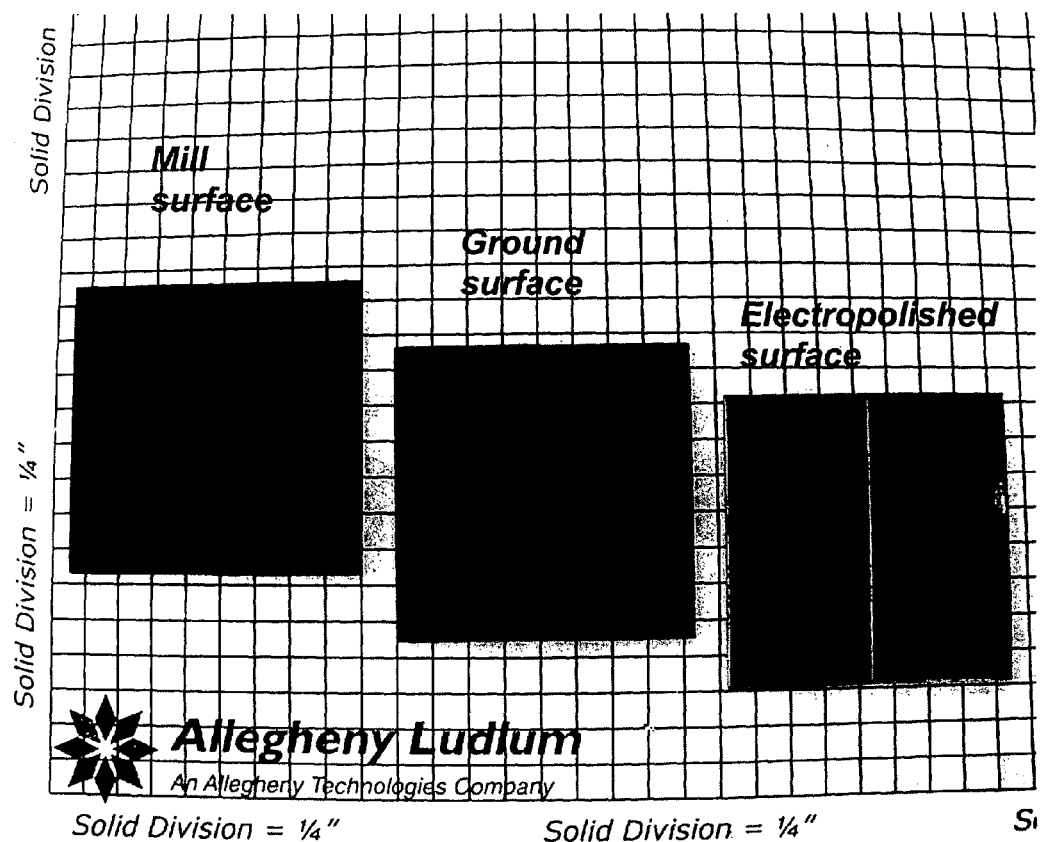
FIG. 2 is a photograph of coupons of AL 453™ stainless steel having mill, ground, or electropolished surfaces after 500 hours exposure at 750° C. (1382° F.) in air.
Figure 3:
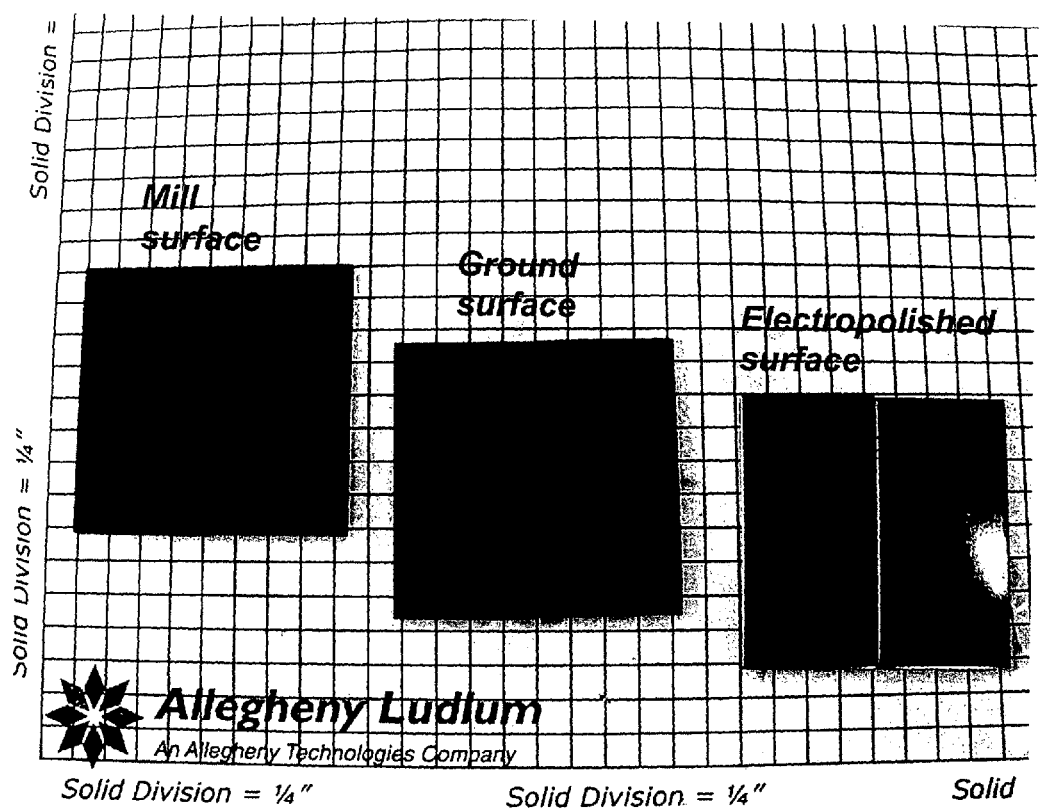
FIG. 3 is a photograph of coupons of AL 453™ stainless steel having mill, ground, or electropolished surfaces after 500 hours exposure at 850° C. (1562° F.) in air.

FIGS. 2 and 3 depict coupons with the three surface treatments after exposure for 500 hours at 750° C. (1382° F.) (FIG. 2) and for 500 hours at 850° C. (1562° F.) (FIG. 3). Both the mill and ground samples formed the characteristic charcoal-grey adherent oxide scale generally observed for stainless steels. The electropolished samples, however, formed a transparent golden oxide film through which the original metal surface was visible. This indicates that the oxide on the electropolished samples is extremely thin despite the long exposure time, and was substantially thinner than the oxide scale formed on the mill and ground surfaces.

Figure 4:
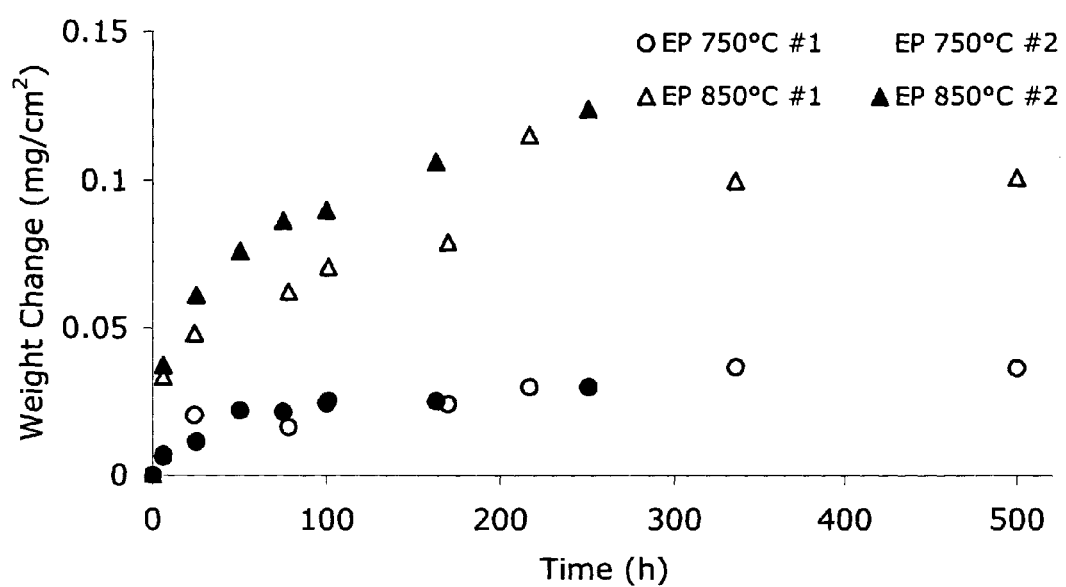
FIG. 4 is a plot of specific weight change ($mg/cm^2$) over time for samples of AL 453™ stainless steel having electropolished surfaces exposed at 750° C. (1382° F.) and 850° C. (1562° F.) in air.
Figure 5:
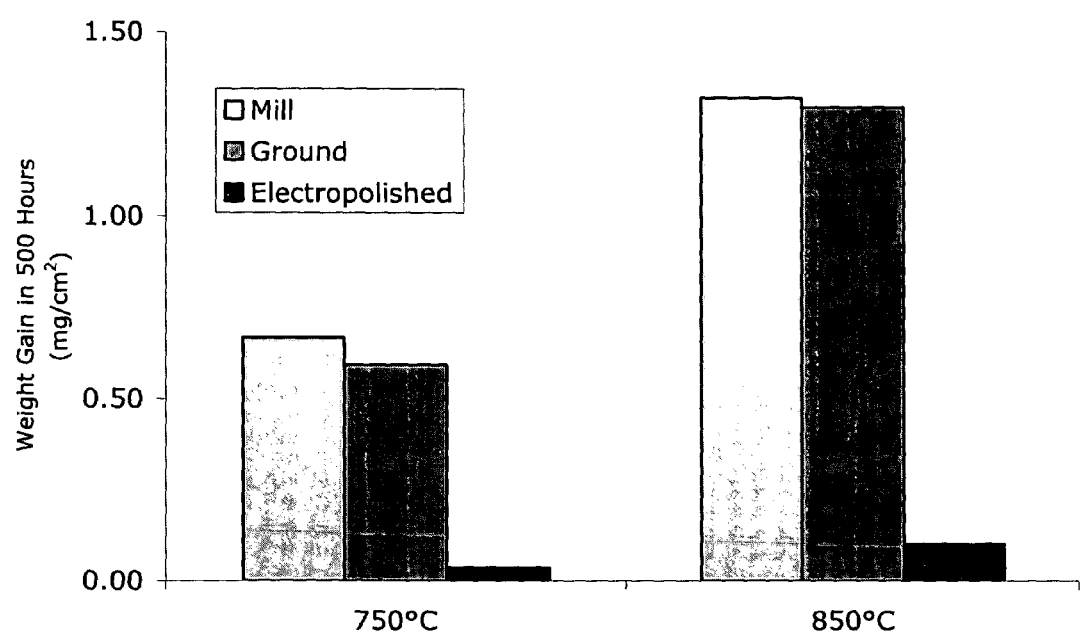
FIG. 5 is a graphical depiction of specific weight change ($mg/cm^2$) for samples of AL 453™ stainless steel having mill, ground, or electropolished surfaces after 500 hours exposure at 750° C. (1382° F.) and 850° C. (1562° F.) in air.
Figure 6:
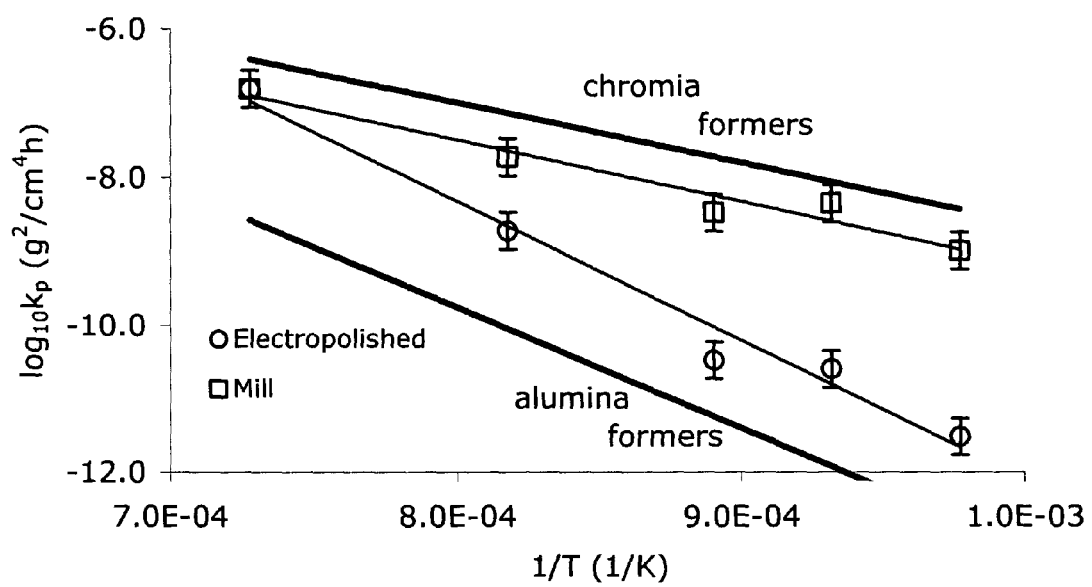
FIG. 6 is an Arrhenius plot of the oxidation performance of electropolished AL 453™ stainless steel compared to standard AL 453™ stainless steel and generic heat-resistant alloys that rely on the formation of chromium and aluminum oxide for oxidation resistance.

Oxidation data derived from the individual weight measurements of the electropolished samples is shown in FIG. 4, which plots specific weight change in mg/cm$^2$ versus time at 750° C. (1382° F.) and 850° C. (1562° F.), and wherein the measurements are identified as data points #1. FIG. 5 graphically depicts specific weight change in (mg/cm$^2$) after 500 hours at temperature for the mill, ground and electropolished samples. The data indicates that the mill and ground surfaces oxidized at substantially the same rate, while the electropolished samples gained significantly less weight than the other samples during the exposure period. The significance of the difference between the oxidation performance of the samples is more evident when the data are expressed as parabolic rate constants. The parabolic rate constant distills an entire oxidation weight change curve into a single number, $k_p$. When expressed on an Arrhenius plot of the logarithm of the parabolic rate constant versus inverse temperature, a unit difference in log $k_p$ translates to a significant reduction in the rate of oxidation (for example, a 2-point reduction in $k_p$ corresponds to about 10× reduction in specific weight change over time). Based on the log $k_p$ values shown in the following Table 2, the rate of oxidation of the electropolished samples was several orders of magnitude lower than that of the mechanically finished mill and ground surfaces, with a corresponding reduction in final specific weight change of about an order of magnitude. When plotted versus the available rate constant data, as shown in FIG. 6, the rate curve for electropolished AL 453™ alloy was found to be greater than that of alumina, but considerably less than that of normal chromia formers or mill-finished AL 453™ alloy. The activation energies, as represented by the slopes of the curves, also are considerably different and, therefore, are not representative of REM-doped chromia or of alumina.

TABLE 2

| Temperature | | Log $k_p$ (g$^2$/cm$^4$h) | | |
|---|---|---|---|---|
| ° C. | ° F. | Mill Surface | Ground Surface | Electropolished Surface |
| 750 | 1382 | −9.0 | −9.1 | −11.5 |
| 850 | 1562 | −8.5 | −8.5 | −10.5 |

A second set of electropolished samples was prepared to confirm the observations above. A different test furnace was used, and the electropolished samples were arranged in a different pattern within the furnace. The results of periodic weight measurements of those electropolished samples heated at 750° C. (1382° F.) and 850° C. (1562° F.) is plotted in FIG. 4 as data points #2 and are substantially the same as the results derived from data points #1.

Scanning Auger microscope (SAM) analysis of the post-exposure films on the electropolished samples heated at both 750° C. (1382° F.) and 850° C. (1562° F.) revealed that the oxide scale is of a single phase and contains significant concentrations of aluminum, iron and chromium, as determined by standardless semi-quantitative analysis in the Auger. Although it appeared that electropolishing promotes the formation of an aluminum-rich oxide scale, the underlying mechanism could not be determined from the SAM tests. Although the compositions of mill (bright annealed) and ground surfaces prior to oxidation testing were quite different, they exhibited essentially the same oxidation kinetics at high temperature, kinetics substantially different from the kinetics of the electropolished samples. Based on the observation that surface grinding did not improve oxidation resistance, it was determined that the improved oxidation performance of the samples having the electrochemically modified surfaces was not solely attributable to removal of surface defects.

Example 2

Additional testing on two coils from each of two different heats of AL 453™ alloy was conducted to assess the repeatability of electropolishing as a means to significantly enhance high temperature corrosion resistance. The starting material was processed as standard AL 453™ material, which is conventionally single-stage rolled from hot rolled band to 0.075" and then bright annealed. Table 3 lists the quantities of prepared test samples. Table 4 describes the processes used to treat the various sample types prior to testing.

TABLE 3

| Heat | Coil | Mill | Ground | Polished | Electropolished | Re-polished |
|---|---|---|---|---|---|---|
| 898042 | 03232C113 | 1 | 1 | 1 | 2 | 1 |
|  | 03232C123 | 1 | 1 | 1 | 2 | 1 |
| 898043 | 0323C143 | 1 | 1 | 1 | 2 | 1 |
|  | 03232C132 | 1 | 1 | 1 | 2 | 1 |
| Total per condition |  | 4 | 4 | 4 | 8 | 4 |

TABLE 4

| Sample Designation | Surface Processing |
|---|---|
| Mill | 2BA finish, as received, no further surface preparation. |
| Ground | All surfaces ground with 120 grit SiC paper, removing 0.002" (nominal) per side. |
| Polished | All surfaces ground with 120 grit SiC paper, removing 0.002" (nominal) per side. All surfaces then polished to specular finish using successively finer grinding papers and lapping compounds, ending with 1 micron diamond paste. |
| Electropolished | All surfaces ground with 120 grit SiC paper, removing 0.002" (nominal) per side. All surfaces then electropolished as described above. |
| Re-polished | All surfaces ground with 120 grit SiC paper, removing 0.002" (nominal) per side. All surfaces then electropolished as described above. All electropolished surfaces re-polished maintaining specular finish using 1 micron diamond paste. |

As indicated in Table 4, testing was conducted on samples having two additional surface finishes, referred to as "polished" and "re-polished". "Polished" refers to samples mechanically polished to a specular surface finish using conventional metallographic techniques to approximate the physical smoothness of an electropolished surface. "Re-polished" refers to an electropolished surface that was mechanically polished to remove material immediate to the electropolished surface of the sample and to maintain a specular finish. All 24 samples were exposed for 250 hours at 800° C. (1472° F.) in air in groups of six samples using three different furnaces, for a total of four test runs.

Figure 7:
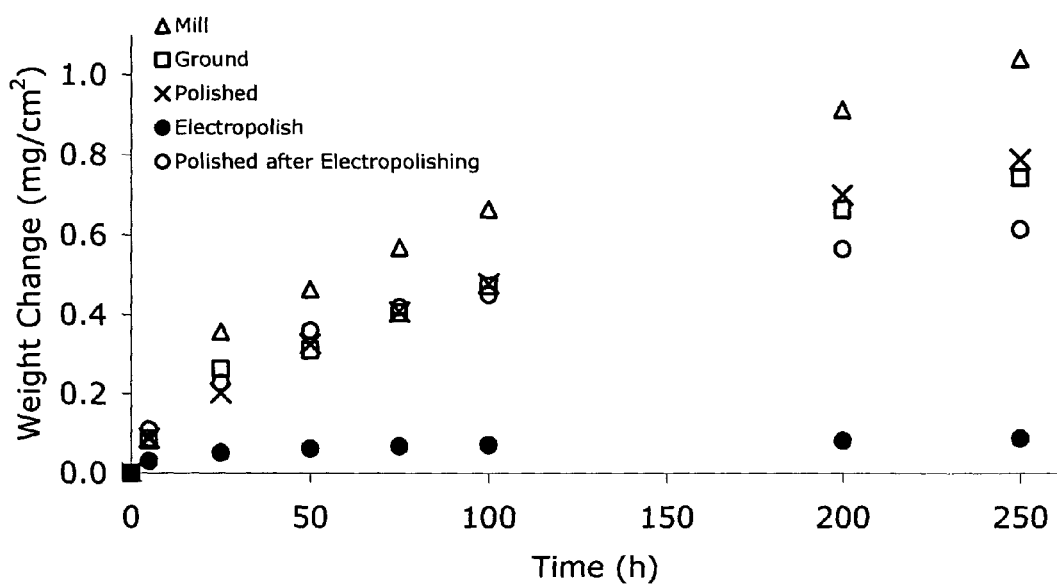
FIG. 7 is a plot of specific weight change over time for samples of AL 453™ stainless steel prepared with several different surfaces exposed at 800° C. (1472° F.) in air.
Figure 8:
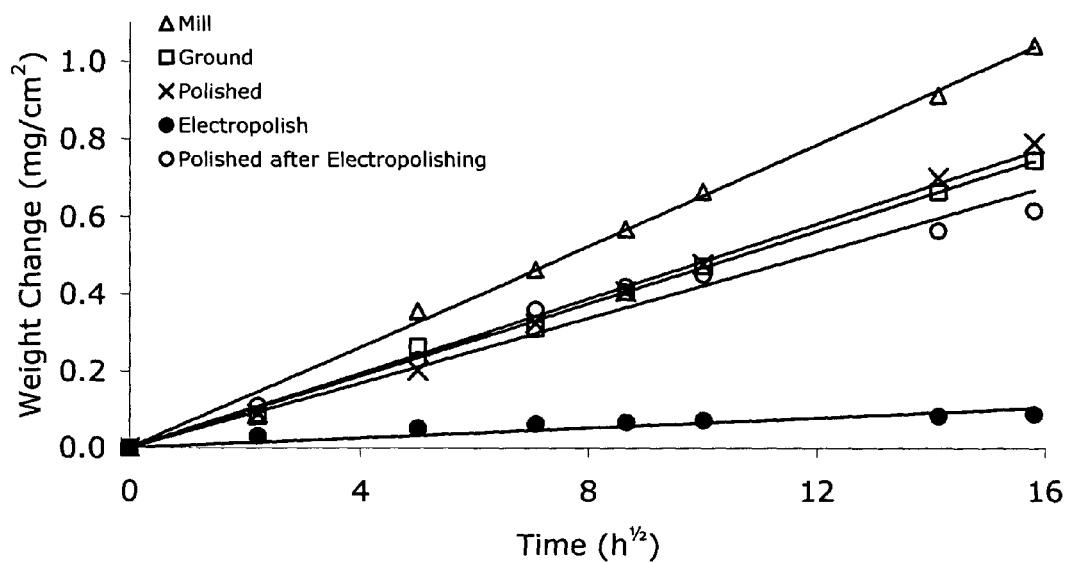
FIG. 8 is a parabolic plot of specific weight change over the square root of time for samples of AL 453™ stainless steel prepared with several different surfaces exposed at 800° C. (1472° F.) in air.

The test results indicated that the improvement in oxidation resistance achieved in Example 1 above through electropolishing is fully repeatable. Mechanically grinding or polishing the surface of the AL 453™ samples resulted in modest improvement in oxidation resistance over the standard mill (bright annealed) surface. Electropolished samples, however, exhibited an order of magnitude reduction in oxidation weight change. The results are graphically depicted in FIG. 7 (average specific weight change in sample type as a function of time) and in the parabolic plot of FIG. 8 (average specific weight change in sample type as a function of the square root of time).

Figure 9:
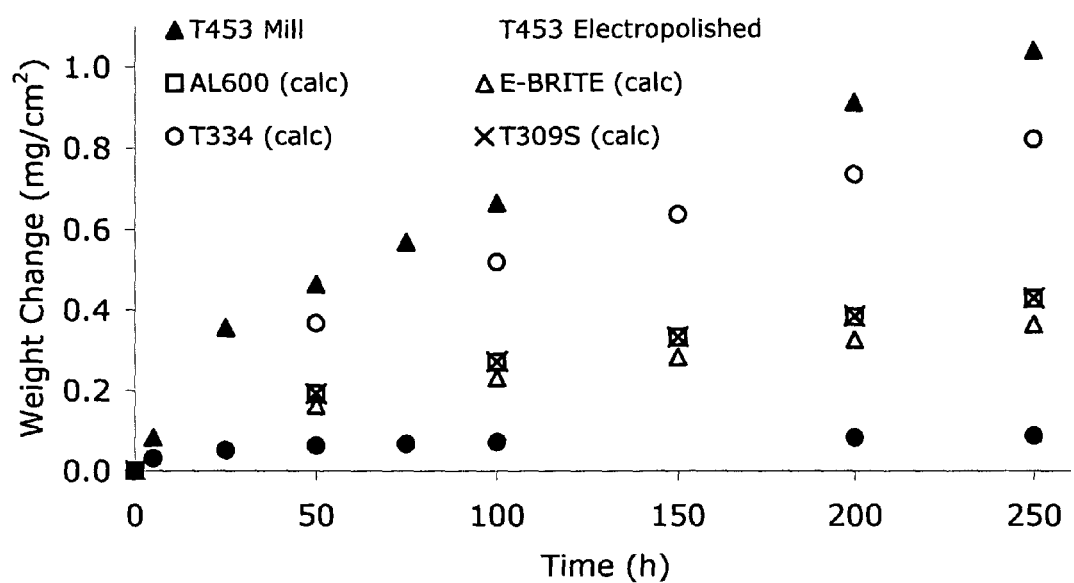
FIG. 9 is a plot of specific weight change over time for samples of electropolished AL 453™ stainless steel and several other heat-resistant stainless steel and nickel-base alloys exposed at 800° C. (1472° F.) in air.

The oxidation resistance of electropolished AL 453™ alloy at 800° C. (1472°) also was compared with the oxidation resistance of several common heat-resistant stainless steels and nickel-base alloys, all of which principally rely on the formation of chromium oxide for resistance to high temperature oxidation. Because actual data at 800° C. (1472° F.) was not available for most of those alloys, data obtained at 704° C. (1300° F.), 760° C. (1400° F.), 816° C. (1500° F.) and 871° C. (1500° F.) were interpolated to yield the expected sample specific weight change curves at the desired temperature. The results for electropolished AL 453™ alloy are plotted alongside these curves in FIG. 9. The best chromium oxide formers (E-BRITE® alloy, Type 309S alloy and AL 600™ alloy) gain about ten times as much weight as electropolished AL 453™ alloy after 250 hours at 800° C. (1472° F.).

The foregoing tests results indicate that electropolishing or otherwise electrochemically modifying one or more surfaces of AL 453™ alloy or alloys of similar composition substantially improves high temperature oxidation resistance of the modified surfaces, and that the phenomenon is repeatable and, thus, may be applied commercially. The reduction in oxidation rate appears to be unique to a surface having a structure produced by electrochemical modification, such as by electropolishing; mechanical polishing to a specular finish does not produce like results, and lightly polishing an electropolished surface to thereby remove the modified surface layer reverses the improvement in oxidation resistance.

The high temperature oxidation resistance exhibited by the electropolished material makes the material suitable for use in high temperature applications, such as interconnect material for SOFCs. Area Specific Resistance (ASR) describes the performance of a fuel cell interconnect and how it degrades over time as the surface oxide scale thickens and resists the flow of electricity to a greater degree. Recent work indicates that conventional AL 453™ alloy and E-BRITE® alloy, along with certain other chromium-rich ferritic stainless steels, reach ASR values that are unacceptably high for long-term SOFC operation because the oxide scale formed on these materials grows too rapidly and impedes current flow between the individual cells in the fuel cell stack. More oxidation-resistant aluminum-bearing ferritic stainless steels form thinner alumina surface scales, but the intrinsic electrical resistivity of aluminum oxide also results in an unacceptably high ASR value over time. Further structural characterization of the thin aluminum-rich oxides formed on electropolished AL 453™ alloy at high temperatures, discussed in Example 3 below, confirmed that the oxides include a significant level of iron and chromium, along with aluminum, suggesting that the oxide formed on electropolished AL 453™ alloy should be more electrically conductive in the absolute sense than aluminum oxide. This, combined with the decrease in thickness due to low rate of oxidation, should result in better performance, as manifested by a slower rate of ASR increase. The presence of aluminum and iron should also reduce the tendency of pure chromium oxide to evaporate at high temperatures in the presence of air and water vapor. This is a major cause of high temperature attack in PSOFCs, as the volatile chromia deposits elsewhere in the cell and degrades performance by damaging components such as the ceramic cathode.

Example 3

Glancing incidence X-ray diffraction techniques were used to characterize the nature of the oxide film formed on embodiments of the electrochemically modified ferritic stainless steels of the present disclosure. The oxidation of conventional bright annealed AL 453™ alloy occurs in a manner typical for a heat-resistant stainless steel containing more than about 16% chromium by weight. $Al_2O_3$ is thermodynamically stable and should form in direct contact with the surface of the alloy. A minimum of about 3 weight percent aluminum, however, is needed to ensure rapid enough diffusion to the metal/ oxide interface to sustain the growth of a continuous layer of alumina. Therefore, in conventional bright annealed AL 453™ alloy, a chromium oxide ($Cr_2O_3$) layer forms in direct contact with the alloy surface, along with significant amounts of iron and spinel oxides. Aluminum oxide particles form in the alloy adjacent the scale/alloy interface. Such behavior is consistent with the established theory of alloy oxidation first proposed by Carl Wagner in the 1950's. See C. Wagner, Z. Electrochem., 63, p. 772 (1959).

A Phillips X'Pert diffractometer was used to scan a sample of electropolished AL 453™ alloy (heat #898042, coil #03232C123A), which had been exposed at 800° C. (1472° F.) for 250 hours. The diffractometer was operated in glancing incidence mode, in which the incident beam is oblique to the surface at an angle omega (Ω), so as to obtain patterns near the sample's surface. A monochromatic Cu $K_\alpha$ parallel X-ray source served as the incident beam. Diffraction patterns were obtained at Ω values of 1 and 3 degrees, which ensured that along with the surface film reflections, peaks from the ferritic stainless steel substrate were included in both patterns and were used as reference points for both location and intensity of other reflections (the intensity of the substrates peaks increases relative to that of the surface film peaks as Ω increases). The scans were run from 10° to 90° 2Θ at a scan rate of approximately 0.02 degree/second. The maximum absolute intensity was about 1,000 counts in the 1° Ω pattern, and about 4,000 counts in the 3° Ω pattern. The Search-Match routine in the Phillips X'Pert software suite was used to provide a list of potential matching patterns for phase identification.

Based on diffractometry results, the oxide film on the electropolished AL 453™ sample was of a single phase with a hematite structure ($M_2O_3$). The experimentally determined diffraction pattern is representative of a single phase. Measured lattice parameters were $a_o$ in the range of 4.95 to 5.04 Å and $c_o$ in the range of 13.58 to 13.75 Å. The diffractometry results suggest nominal lattice parameters for the oxide film are $a_o$=4.98 Å and $c_o$=13.57 Å. The nominal lattice parameters for the oxide film formed on the electropolished AL 453™ sample are listed in Table 5, along with representative lattice parameters for $Fe_2O_3$, alpha $Cr_2O_3$ and alpha $Al_2O_3$. Measured lattice parameters of the oxide film on the electropolished sample are bracketed by patterns for $Fe_2O_3$ (hematite, larger lattice parameters), alpha $Cr_2O_3$ (eskolaite, smaller lattice parameters) and various phases of hematite with chromium substituted for iron. The reference pattern for alpha $Al_2O_3$ (corundum, also a member of the hematite isostructural group) does not match the experimentally determined diffraction pattern for electropolished AL 453™ alloy as alpha $Al_2O_3$ exhibits significantly smaller lattice parameters.

Accordingly, measurements of interplanar spacing indicate that the phase constituting the aluminum-rich oxide film has lattice parameters intermediate that of $Cr_2O_3$ and $Fe_2O_3$, and significantly less than that exhibited by $Al_2O_3$. Therefore, while the oxide film formed on the electrochemically modified samples was rich in aluminum, it is not typical of alpha aluminum. Thus, the aluminum-rich oxide layer formed on the electropolished samples was not found to consist solely of highly electrically resistive alpha $Al_2O_3$.

TABLE 5

| | $a_o$ (Å) | $c_o$ (Å) | Source |
|---|---|---|---|
| α-$Al_2O_3$ | 4.758 | 12.991 | JCPDS 10-173 |
| $Cr_2O_3$ | 4.954 | 13.584 | JCPDS 6-0504 |

TABLE 5-continued

| | $a_o$ (Å) | $c_o$ (Å) | Source |
|---|---|---|---|
| Surface oxide formed on experimental samples | 4.98 | 13.57 | Experimental measurement |
| $Fe_2O_3$ | 5.356 | 13.7489 | JCPDS 33-664 |

Example 4

The effect on high temperature oxidation performance of varying levels of aluminum, chromium and REM, specifically cerium and lanthanum, added as mischmetal was evaluated. Five 50 lb. VIM heats were melted to the chemistries shown in Table 6 and were processed to 0.075" thick for oxidation testing. Samples from each heat were tested in the pickled condition as a baseline, along with samples having surfaces ground to a 120 grit finish and with surfaces electrochemically modified by electropolishing to a mirror finish. All samples were exposed for 250 hours at 800° C. (1472° F.) using duplicate samples per surface condition. Each of the pickled and ground samples exhibited oxidation resistance comparable or slightly better than typical 2BA AL 453™ material.

TABLE 6

| | Composition (weight percent) | | |
|---|---|---|---|
| Heat Number | Chromium | Aluminum | Cerium + Lanthanum |
| RV1908 | 17.8 | 0.78 | 0.062 |
| RV1909 | 23.3 | 0.69 | 0.026 |
| RV1912 | 21.4 | 0.68 | 0.002 |
| RV1917 | 21.6 | 0.32 | 0.049 |
| RV1929 | 21.8 | 0.95 | 0.063 |
| AL 453 (nominal) | 22 | 0.78 | 0.05 |

Figure 10:
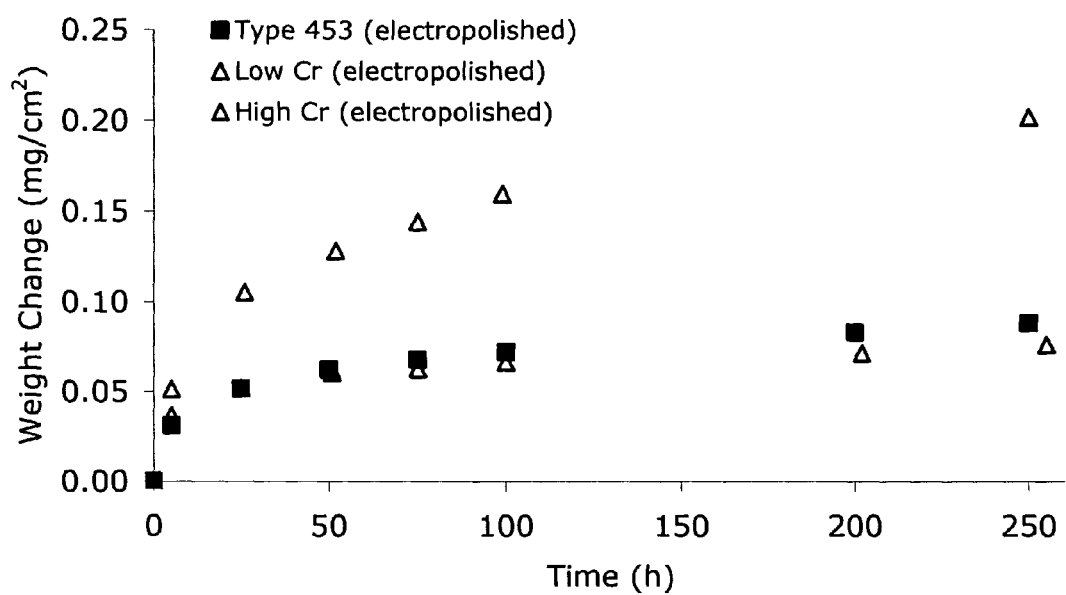
FIG. 10 is a plot of specific weight change over time for several electropolished ferritic stainless steel samples including varying levels of chromium exposed at 800° C. (1472° F.) in air.

Varying the chromium content relative to the nominal content in AL 453™ alloy had only a minor impact on the weight gain of electropolished samples. As shown in FIG. 10, the electropolished samples of low-chromium heat RV1908 (17.8%) performed better than electropolished samples of high-chromium heat RV1909 (23.3%), although the high-chromium heat contained a lower level of REM. Electropolished samples from both of heats RV1908 and RV1909 exhibited oxidation performance comparable to that of electropolished standard AL 453™ alloy. Ferritic stainless steels including lower chromium contents are generally less costly, more easily manufactured, and more stable in that they are less likely to develop sigma or other brittle phases. Also, the results herein indicate that electropolishing is slightly more effective in enhancing oxidation resistance when applied to lower chromium alloys. On the other hand, higher chromium levels reduce the CTE, which may improve the performance of the alloys as interconnect materials in SOFCs. Given these observations, and in view of cost and metallurgical concerns, chromium preferably is present in the ferritic stainless steels of the present disclosure in the range of about 16 up to less than about 30 weight percent, and is more preferably in the range of 16 up to 19 weight percent.

Figure 11:
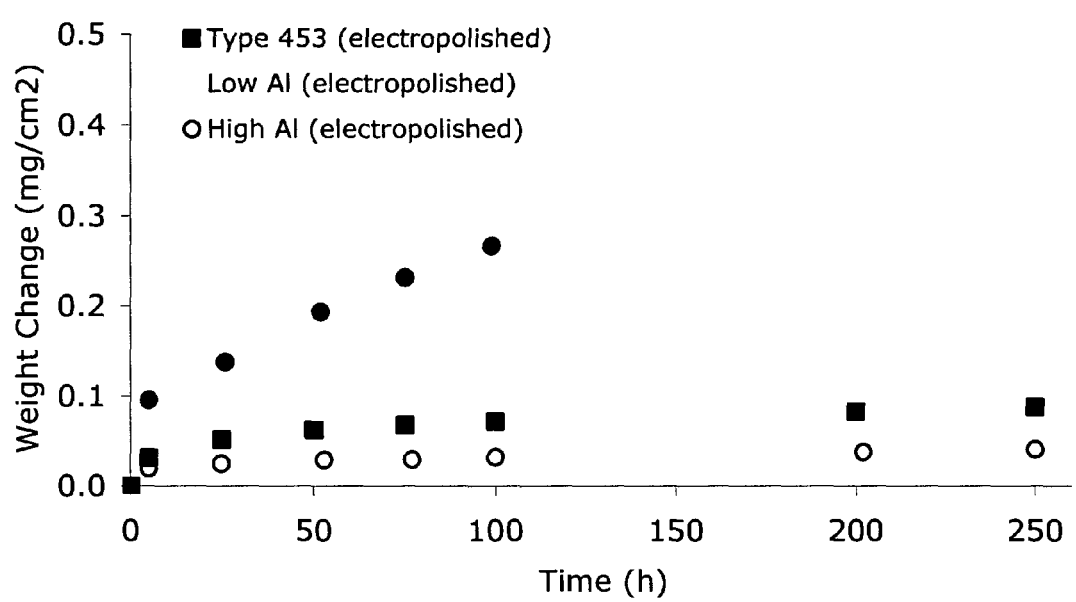
FIG. 11 is a plot of specific weight change over time for several electropolished ferritic stainless steel samples including varying levels of aluminum exposed at 800° C. (1472° F.) in air.

Varying the aluminum content was found to have a significant effect on the oxidative weight gain of the samples having surfaces that were electrochemically modified by electropolishing. As shown in FIG. 11, electropolished samples of low-aluminum heat RV1917 (0.32%) performed poorly relative to both electropolished standard AL 453™ alloy and electropolished samples of high-aluminum heat RV1929 (0.95%), but still exhibited a two-fold weight gain reduction relative to samples of AL 453™ alloy with a standard mill finish. On the other hand, the addition of increasing levels of aluminum risk the formation of alumina, which could negatively effect the electrical resistance of the material if it is to be applied for SOFC interconnect applications. Based on these results, aluminum preferably is present in the ferritic stainless steels of the present disclosure in an amount of at least 0.2 weight percent, and more preferably within the range of about 0.2 weight percent up to about 1.0 weight percent.

Figure 12:
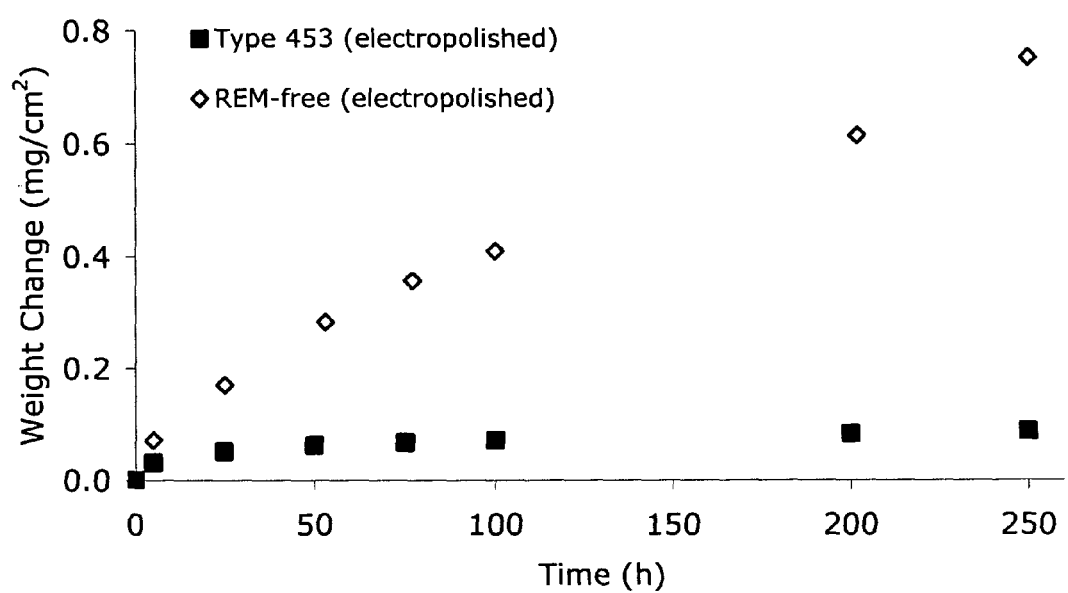
FIG. 12 is a plot of specific weight change over time for several electropolished ferritic stainless steel samples including varying levels of rare earth elements exposed at 800° C. (1472° F.) in air.

As shown in FIG. 12, eliminating REM had a very significant effect on oxidation resistance. The oxidation performance of REM-free heat RV1912 (residual levels of 0.02% cerium+lanthanum) showed that the beneficial effect of the electrochemical surface modification produced by electropolishing was substantially completely eliminated in a REM-free version of the AL 453™ alloy. On the other hand, the addition of high levels of REM may overdope the alloy, leading to excessive weight gain due to oxidation of REM-rich particles. Accordingly, the total REM content in the ferritic stainless steels of the present disclosure preferably is greater than 0.2 weight percent up to about 1.0 weight percent. Although mischmetal, which contains significant levels of cerium and lanthanum, was used in the examples herein, it is believed that either REM may be used alone, and that other REMs may be used in place of or in addition to cerium and/or lanthanum. For example, yttrium is generally considered to be the most effective REM, although it is significantly expensive. Hafnium also is generally considered an effective REM, but is less available than mischmetal. Other REMs are quite difficult to obtain in commercial quantities.

Figure 13:
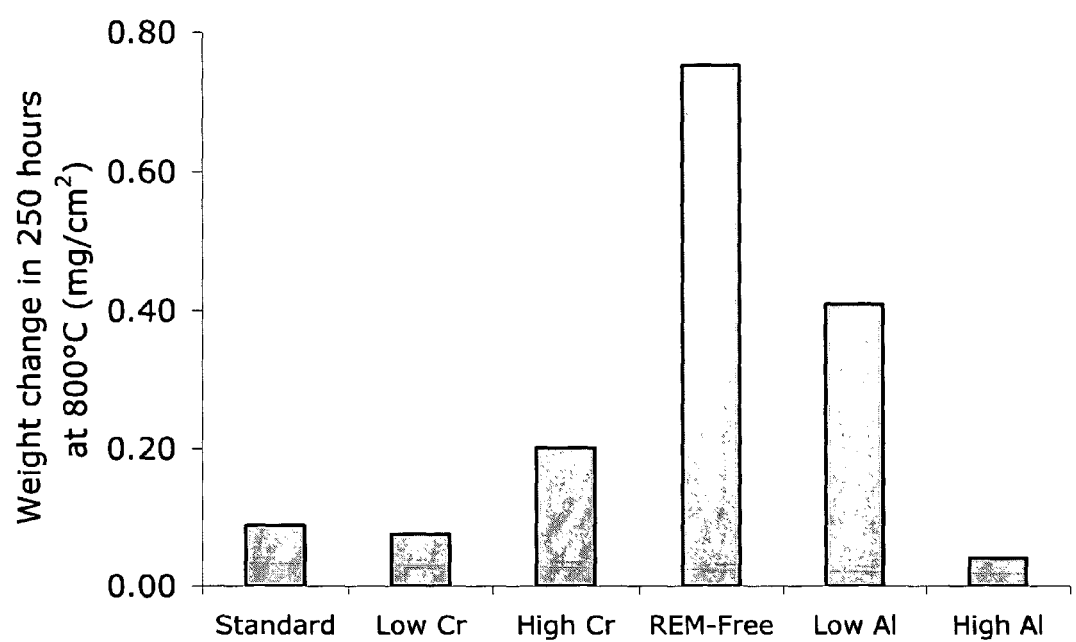
FIG. 13 is a graphical depiction of specific weight change results for several electropolished ferritic stainless steels samples including varying levels of alloying additions after 250 hours at 800° C. (1472° F.) in air.

FIG. 13 summarizes the results of the oxidation testing. The addition of REM, notably cerium and lanthanum, appears to be required to provide the observed reduction in oxidative weight gain in the electropolished material. The electropolishing effect also appears to be sensitive to aluminum content, with a diminished effect noted at an aluminum level of 0.32%. It is believed that increasing the aluminum content, such as in the range of up to 1.0% or greater, may provide additional reduction in weight change. Within the bounds of the experiments performed, the electrochemical surface modification produced by electropolishing does not appear to be particularly sensitive to varying chromium content. Considering the test results, a preferred ferritic stainless steel composition that would benefit from an electrochemical surface modification such as that produced by electropolishing includes, in weight percentages, about 18% to about 22% chromium, about 0.4% to about 0.8% aluminum and about 0.02% to about 0.2% REM. Another preferred ferritic stainless steel that would benefit from the electrochemical surface modification includes, in weight percentages, about 18% chromium, about 0.8% aluminum and about 0.3% REM, and may provide a material particularly suitable for SOFC interconnects. In addition to chromium, aluminum and REM, ferritic stainless steels that may be advantageously processed by the methods described in the present disclosure may include other alloying additions as are known in the art. For example, and without intending to limit the scope of the present disclosure in any way, certain embodiments of the ferritic stainless steel may include, in weight percentages, up to 3 nickel, up to 3 manganese, up to 0.7 silicon, up to 0.07 nitrogen, up to 0.07 carbon and up to 0.5 titanium.

In light of the high temperature oxidation resistance of ferritic stainless steels processed according to the present disclosure, such steels may be advantageously applied as interconnects for fuel cells, including SOFCs and PSOFCs. Moreover, examples of additional articles of manufacture that may be advantageously constructed to include the ferritic stainless steels described herein include apparatus subjected to high temperature and relatively oxidizing environments, such as high-temperature manufacturing equipment, high-temperature handling equipment, calcining equipment, glass making equipment, glass handling equipment and heat exchanger components. In addition, ferritic stainless steel articles such as, for example, plate, sheet, strip, foil and bar, that are intended for fabrication into articles of manufacture also may be processed using the methods described herein. It will be understood that the foregoing articles are merely non-exhaustive examples of articles that may include the ferritic stainless steels as descried herein and that other such articles may be apparent to those having ordinary skill after having considered the present disclosure. Also, although the present disclosure includes examples wherein electropolishing is used to electrochemically modify the surface of a ferritic stainless steel, it will be understood that the present disclosure is not so limited and also encompasses other means of electrochemically modifying metallic surfaces that provide surfaces on the treated ferritic stainless steels exhibiting similar improvement in high temperature oxidation resistance.

It will be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

What is claimed is:

1. A method for making a ferritic stainless steel article having an oxidation resistant surface, the method comprising:
providing a ferritic stainless steel comprising 0.2 to 1.0 weight percent aluminum, 16 to less than 30 weight percent chromium, and at least one rare earth metal selected from the group consisting of cerium, lanthanum, and praseodymium, wherein the total weight of rare earth metals is from 0.02 to 1.0 weight percent; and
electropolishing at least one exposed surface of the ferritic stainless steel,
so that, when subjected to an oxidizing atmosphere at high temperature, the exposed electropolished surface develops an electrically conductive, aluminum-rich, oxidation resistant oxide scale comprising chromium and iron and having a hematite structure differing from $Fe_2O_3$, alpha $Cr_2O_3$, and alpha $Al_2O_3$.

2. The method of claim 1, wherein lattice parameters $a_o$ and $c_o$ of the oxide scale differ from $a_o$ and $c_o$ of $Fe_2O_3$, alpha $Cr_2O_3$, and alpha $Al_2O_3$.

3. The method of claim 1, wherein the at least one exposed electropolished surface develops the oxide scale when heated in an oxidizing atmosphere at a temperature in the range of 750° C. to 850° C.

4. The method of claim 1, wherein the at least one exposed electropolished surface develops the oxide scale when heated in an oxidizing atmosphere for at least 100 hours at a temperature in the range of 750° C. to 850° C.

5. The method of claim 1, wherein the oxide scale is characterized by lattice parameters $a_o$ in the range of 4.95 to 5.04 Å and $c_o$ in the range of 13.58 to 13.75 Å.

6. The method of claim 1, wherein the oxide scale is characterized by nominal lattice parameters $a_o$=4.98 Å and $c_o$=13.57 Å.

7. The method of claim 1, wherein the exposed electropolished surface develops the oxide scale when heated in an oxidizing atmosphere for at least 100 hours at a temperature in the range of 750° C. to 850° C., and wherein the oxide scale is characterized by $a_o$ in the range of 4.95 to 5.04 Å and $c_o$ in the range of 13.58 to 13.75 Å.

8. A method for making a ferritic stainless steel article having at least one oxidation resistant surface, the method comprising:
   providing a ferritic stainless steel comprising 0.2 to 1.0 weight percent aluminum, 16 to less than 30 weight percent chromium, and at least one rare earth metal selected from the group consisting of cerium, lanthanum, and praseodymium, wherein the total weight of rare earth metals is from 0.02 to 1.0 weight percent; and
   electropolishing at least one exposed surface of the ferritic stainless steel,
   so that the exposed electropolished surface develops an aluminum-rich oxide scale when heated in an oxidizing atmosphere for at least 100 hours at a temperature in the range of 750° C. to 850° C., the oxide scale comprising iron and chromium and having a hematite structure, $a_o$ in the range of 4.95 to 5.04 Å, and $c_o$ in the range of 13.58 to 13.75 Å.

9. A method for making a ferritic stainless steel article having at least one oxidation resistant surface, the method comprising:
   electropolishing at least one exposed surface of a ferritic stainless steel comprising 0.4 to 0.8 weight percent aluminum, 18 to 22 weight percent chromium, and 0.02 to 0.2 weight percent rare earth metals, wherein the rare earth metals are selected from the group consisting of cerium, lanthanum, praseodymium, and combinations of any thereof;
   wherein the electropolishing chemically modifies the at least one exposed surface of the ferritic stainless steel so that the electropolished exposed surface develops an aluminum-rich oxide scale when heated in an oxidizing atmosphere at a temperature in the range of 750° C. to 850° C., the aluminum-rich oxide scale comprising iron and chromium and having a hematite structure, $a_o$ in the range of 4.95 to 5.04 Å, and $c_o$ in the range of 13.58 to 13.75 Å.

10. The method of claim 9, further comprising heating the ferritic stainless steel article in an oxidizing atmosphere at a temperature in the range of 750° C. to 850° C., wherein the exposed electropolished surface develops an aluminum-rich oxide scale comprising iron and chromium and having a hematite structure, $a_o$ in the range of 4.95 to 5.04 Å, and $c_o$ in the range of 13.58 to 13.75 Å.

11. The method of claim 9, wherein the electropolishing decreases the rate of oxidation of the ferritic stainless steel by at least one order of magnitude when compared to a non-electropolished sample of the same ferritic stainless steel, when heated in an oxidizing atmosphere at a temperature in the range of 750° C. to 850° C.

* * * * *